Feb. 12, 1952  H. B. WHITE  2,585,885
ELECTRIC TOASTER
Filed July 13, 1948  3 Sheets-Sheet 1

INVENTOR.
Harry B. White
BY
Harry S. Dumars
ATTORNEY.

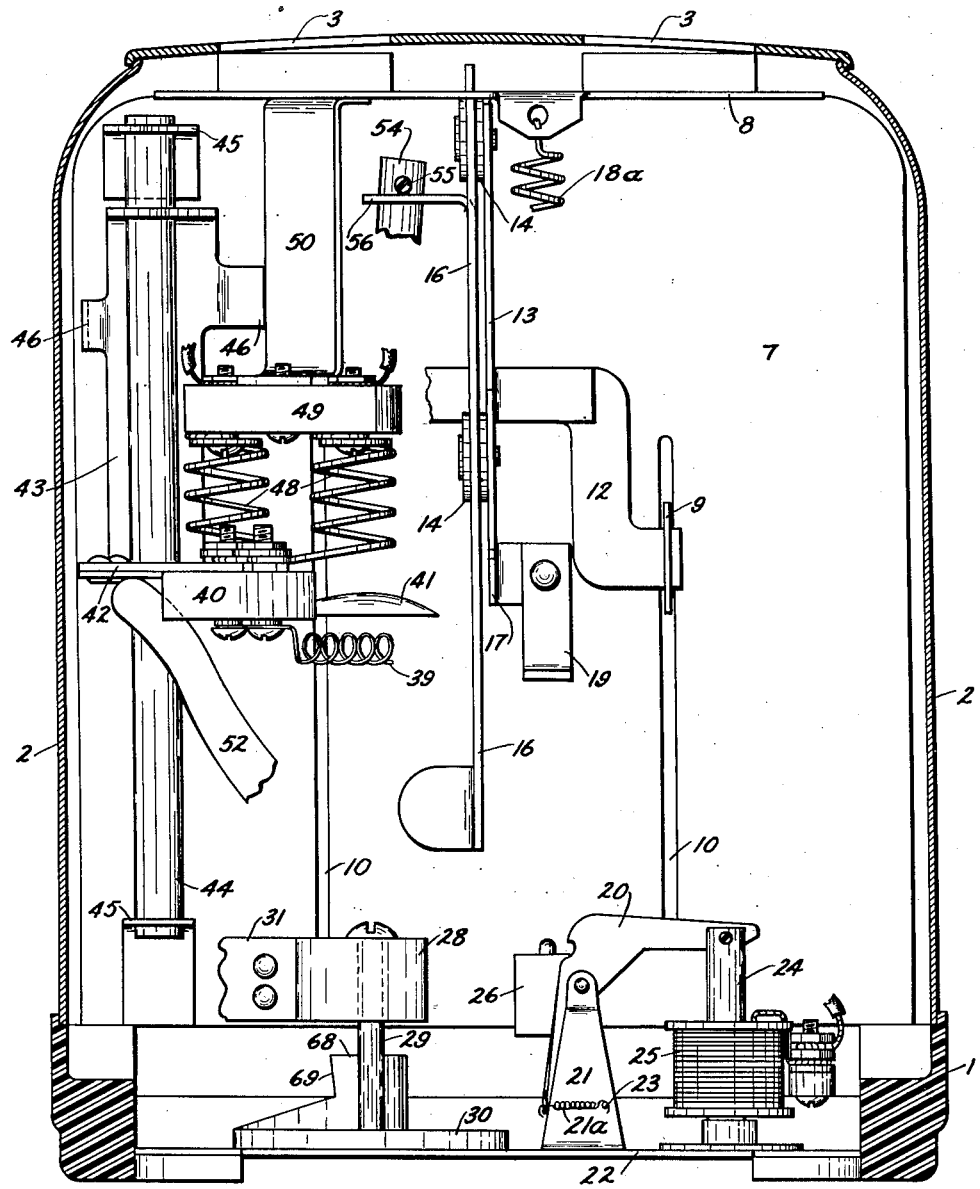

Feb. 12, 1952 H. B. WHITE 2,585,885
ELECTRIC TOASTER
Filed July 13, 1948 3 Sheets-Sheet 3

INVENTOR.
Harry B. White
BY
Harry S. Dumass
ATTORNEY.

Patented Feb. 12, 1952

2,585,885

UNITED STATES PATENT OFFICE 2,585,885

ELECTRIC TOASTER

Harry B. White, Canton, Ohio, assignor to The Hoover Company, North Canton, Ohio, a corporation of Ohio Application July 13, 1948, Serial No. 38,531

21 Claims. (Cl. 219—19)

The present invention relates to the art of cooking devices and more particularly to a novel bread toasting mechanism and timing control means therefor which is efficient, reliable and sure in its operation.

It is a particular object of the present invention to provide an electric bread toasting apparatus having a thermal timer which is self-compensating to adjust the toasting timing period automatically for variations in the oven temperatures when the toasting period is initiated.

It is a further object of the present invention to provide a toaster timing mechanism which automatically adjusts the position of the heating element with reference to the thermal timing element in the intervals between toasting periods to compensate the apparatus exactly for the initial temperature of the toasting oven.

Other objects and advantages of the invention will become apparent as the description proceeds when taken in connection with the accompanying drawings in which:

Figure 3 is an end elevational view with parts broken away to show the construction more clearly of the apparatus of Figure 2;

Figure 4 is a schematic wiring diagram of the toasting apparatus embodied in Figures 2 and 3;

Figures 1, 2:
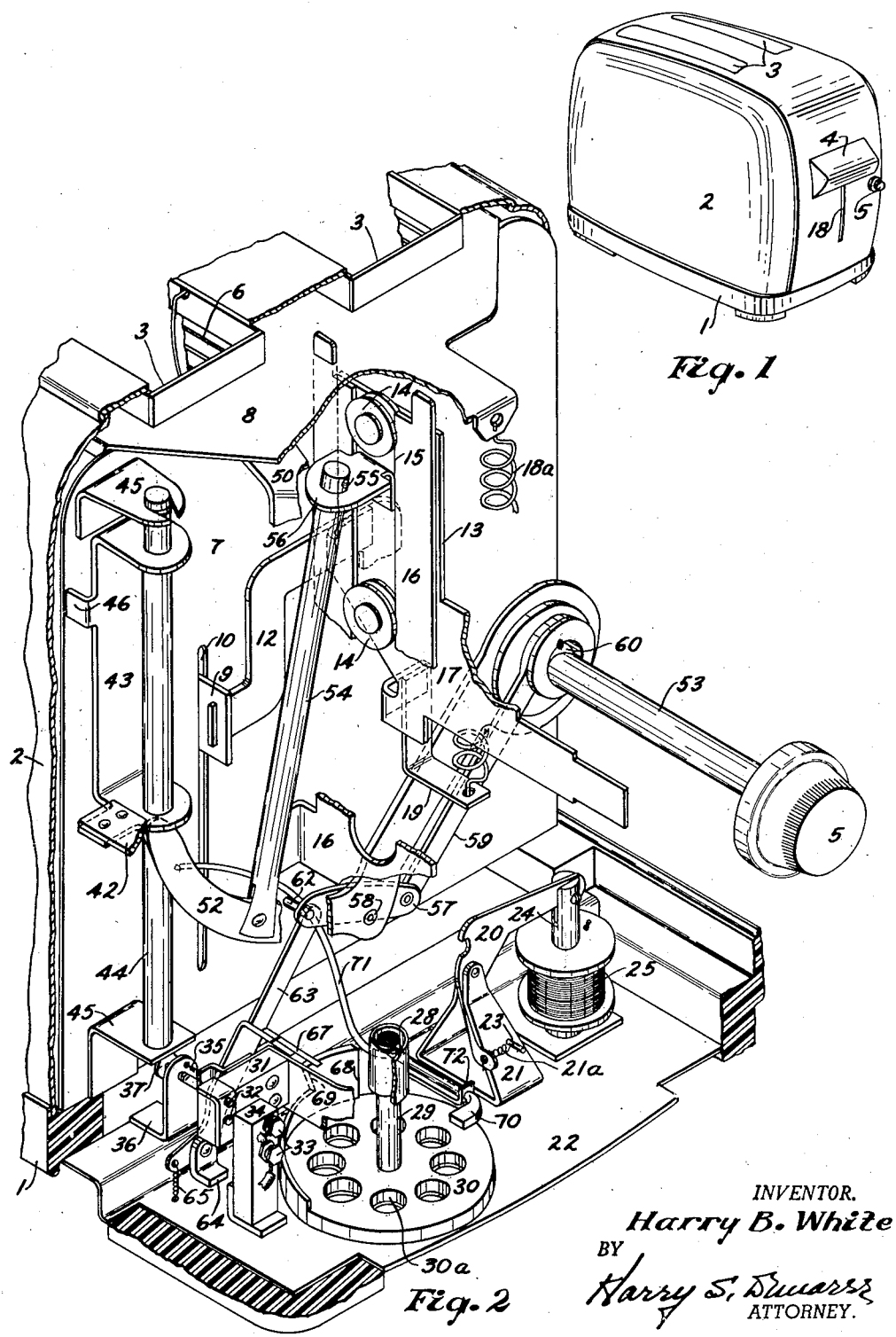
Figure 1 is a perspective view drawn to a small scale of an automatic toasting device embodying the present invention.
Figure 2 is an end perspective view on an enlarged scale with certain portions broken away illustrating the timing mechanism embodying the present invention.

The toasting apparatus and timing mechanism disclosed and claimed in this application is related to the toasting apparatus and timing mechanism disclosed and claimed in my copending application Serial No. 38,532, filed July 13, 1948, and the copending application of George P. Daiger Serial No. 38,411, filed July 13, 1948, and assigned to the assignee of this application.

Referring now to the drawings wherein like reference characters designate like parts throughout the several views, the apparatus of Figure 1 comprises a base structure 1 supporting a cover shell 2 which encases the toasting oven 3 and a timing mechanism to be described hereinafter. A toast carriage lowering handle 4 is mounted upon one end of the cover shell 2. An adjusting dial 5 is mounted on the end of the cover shell 2 adjacent the carriage handle 4 and is for the purpose of regulating the color of the toast desired as will be explained more fully hereinafter.

As shown most clearly in Figures 2 and 3, the toasting ovens 3 are adapted to be heated by electrical heating elements 6 suitably positioned therein to apply radiant heat to the bread to be toasted. A vertical partition plate 7 is attached to and supports a horizontally extending top plate 8. The plate 7 defines one end wall of the ovens 3 and is spaced from the end wall of the cover shell 2 to define a space housing a timing and supporting mechanism now to be described.

The toasting oven 3 has mounted therein conventional toast supporting racks provided with projecting tongues 9 extending through elongated narrow slots 10 in the partition 7. The tongues 9 are rigidly secured to a U-shaped bracket 12 carried by a vertically extending slide and supporting plate 13. The slide plate 13 carries a pair of spaced, grooved rollers 14 which engage in a track formed by the opposite side edges of a slot 15 formed in a vertically extending supporting plate 16 which is rigidly mounted upon the partition plate 7. The supporting plate 13 carries a forwardly extending arm 17 which extends through a slot 18 formed in the end wall of the cover shell 2 and carries the handle 4 upon its outer end exteriorly of the cover shell 2. A tension spring 18a is connected between the plate 8 and an outwardly extending foot lever and latch tongue 19 carried by the lower end of the slide plate 13. When the toast supporting racks are lowered by operation of the handle 4 against the bias of the spring 18a the tongue 19 is engaged by a latch 20 and is secured in lower toasting position against the bias of the spring 18a. The latch 20 is pivotally mounted upon a U-shaped bracket 21 secured to a base plate 22 of the control chamber. The latch 20 has a projecting arm extending to one side of the U-shaped bracket 21 to which is attached a tension spring 21a anchored to a pin 23 on the bracket 21. The tension spring 21a biases the latch 20 to latching position.

The latch 20 is provided with an extending arm which is pivotally connected to the armature 24 of a solenoid having an energizing coil 25. When the coil 25 is energized the armature 24 is pulled into the coil 25 which releases the latch 20 from the latch tongue 19 against the bias of the spring 21a. The spring 18a raises the toast supporting rack and its associated structure to upper, toast ejecting position signifying the end of a toasting period when the latch tongue 19 is released.

The energization of the apparatus is controlled by a switch 26 of the type which is normally biased to open circuit position. The switch 26 is mounted upon the partition walls 7 in position to be engaged by the latch tongue 19 to close the contacts therein to close the circuit for the main element and other parts of the apparatus as will be described more fully hereinafter. As long as the latch tongue 19 is maintained in latched position by the latch 20, the latch tongue 19 maintains the switch 26 in closed circuit position.

The timing mechanism comprises a spiral thermostatic element 28 which is secured at its inner end to a stud 29 rotatably mounted upon the base plate 22. A brake wheel 30 is non-rotatably secured to the stud 29 and is positioned appreciably below the bimetallic element 28 adjacent the base plate 22. The brake wheel 30 may have a series of holes 30a therethrough overlying openings in the base plate 22 to allow cooling air from beneath the toaster to flow over the thermostat 28. The free end of the spiral bimetallic element 28 carries a block 31 of insulating material having a bridging electrical contact element 32 upon its outer end. When the thermostatic element 28 responds to heat it uncoils in a counter-clockwise direction and moves the bridging contact 32 into engagement with a pair of spaced apart electrical contacts 33 mounted upon an insulating post 34 rigidly secured to the base plate 22. Thus the thermostatic element acts to complete the electrical circuit between the contacts 33 for a purpose to be described more fully hereinafter. A small tension spring 35 is connected between the insulating block 31 and a fixed bracket 36 secured to the base plate 22. The bracket 36 also carries an adjustable stop screw 37 which determines the limit to which the spring 35 is permitted to move the contact carrying block 31.

The bimetallic thermostat 28 is adapted to be heated by an electrical resistance heating element 39 carried upon an insulating block 40 which also supports a reflector 41 positioned to reflect radiant heat from the heating element 39 downwardly onto the spiral bimetallic element 28. The insulating block 40 is supported by a bracket 42 which is rigidly carried by a sliding support 43. The sliding support 43 is guided for vertical movement by a slide post 44 carried by a bracket 45 extending outwardly from the end face of the partition plate 7. The bracket 43 includes lateral side wings 46 which are turned backwardly to engage the face of the partition plate 7 on opposite sides of the slide post 44 to prevent the slider 43 from rotating with respect to that post.

Electrical connection is made to the resistance heating element 39 by means of flexible conductors 48 connected between suitable electrical connections on the block 40 and electrical connections on an insulating block 49 fixedly carried by a bracket 50 depending from the top plate 8.

The weight of the heater, reflector and slider combination urges the same downwardly under the attraction of gravity against a curved positioning lever 52. This lever is pivotally mounted upon a shaft 53 which is pivotally mounted upon the partition plate 7 on the side of the toaster opposite to the slide post 44. The lower limit of the heater position is determined by a stop link 54 pivotally connected at one end to the lever 52 and having a pin stop connection 55 at its upper end with a bracket 56 projecting from the toast carriage slide plate 13. The engagement between the pin 55 and bracket 56 determines the lowermost position to which the lever 52 can rotate which in turn determines the lowermost position of the heating element 39. Further by reason of this construction the spring 18a raises the heating element 39 substantially to the position shown in Figure 3 when the latch tongue 19 is released from the latch 20. This arrangement positions the heater 39 an appreciable distance from the thermostat 28 during the intervals between toasting periods which facilitates cooling of both these elements.

An adjusting link 57 is pivoted at 58 to the link 52. One end of the link 57 has a pivotal connection with one end of an eccentric strap bar 59. The other end of the strap bar 59 embraces an eccentric 60 mounted upon the shaft 53, hence rotation of this shaft advances and retracts the strap bar 59 with reference to the pivot 58 of the lever 57 which effects a relative rotation of lever 57 about the pivot 58. The opposite end of the lever 57 carries a stop pin 62 which is positioned to engage a stop link 63 pivotally mounted upon a bracket 64 secured to the base plate 22 of the toaster. A tension spring 65 biases the lever 63 for rotation in a counter-clockwise direction as viewed in Figure 2 to maintain the upper end thereof in contact with the stop pin 62.

The stop limit arm 63 is provided with a laterally projecting foot 67 which bears upon the upper surface of a cylindrical cam 68 mounted upon the periphery of the brake wheel 30. The cylindrical cam 68 is provided with a sharp step down 69 for a purpose to be described hereinafter. It will readily be appreciated from Figure 2 that the heating element 39 and lever 52 can drop downwardly in a direction to bring the heater closer to the thermostat 28 until the stop pin 62 has rotated lever 63 in a clockwise direction to the extent permitted by engagement between the foot 67 and upper edge of the cylindrical cam 68. This is the stop or lower limit position of the thermostat heater.

The brake wheel 30 is adapted to be engaged by a brake foot 70 carried on the end of a cam lever 71. The cam lever 71 is pivotally mounted in a bracket 72 which is supported upon the base plate 22. The projecting portion of the cam lever 71 underlies the path of movement of the toast carriage supporting bar 9. The arrangement is such that the bar 9 engages the cam lever 71 and presses the foot 70 into engagement with the upper face of the wheel 30 when the carriage is latched in toasting position. The pressure between the foot 70 and the upper surface of the wheel 30 is sufficient to prevent rotation of the wheel 30, post 29 and inner end of thermostat 28.

A schematic wiring diagram of the electrical connections of the apparatus is shown in Figure 4. The main control switch 26 is connected directly to one line of the supply source by a conductor 73 and the other side of the switch is connected by a conductor 74 to the main heater 6, auxiliary heater 39 and one of the contacts 33. The winding 25 of the solenoid is connected by a conductor 75 to the other contact 33 and the main heater, auxiliary heater and solenoid winding 25 are then connected to the other line lead. By this arrangement the energization of all the electrical apparatus in the toaster is under the control of the main switch and in addition the solenoid winding 25 is controlled by the switch contacts 33 and conductor bar 32 on the thermostat. When the toast carriage is latched in toasting position, the switch 26 is in closed circuit position and the main and auxiliary heaters are energized. When the thermostat responds to the heat of the auxiliary heating element 39 and closes the circuit between the contacts 33 the solenoid winding 25 is additionally energized to operate the latch 20 to terminate the toasting period.

In the operation of this form of the invention the extent of movement required of the thermostat to shift the contact block 32, positioned against the stop screw 37 into position to close the circuit between the contacts 33 is of very small degree, consequently the heater need only increase the temperature of the thermostat during the toasting period by a comparatively small amount in order to terminate the toasting period. The first toasting period of a toaster of this type starting at a time when the toaster and all parts thereof are substantially at room temperature is customarily comparatively long because of the time required to heat the toasting mechanism to a temperature at which toasting actually begins. For this reason the foot 67 on the heater positioning lever 63 rides on the higher portion of the cam 68 during the first toasting period thus holding the thermostat heater 39 in a comparatively high position. Since the distance between the heater 39 and thermostat 28 is substantial at this time it takes a comparatively long period for the thermostat to heat to the degree required to close the circuit between the contacts 33 which will energize the solenoid 25, shift the latch 20 and release the toast carriage to the bias of spring 18a, and open circuit the main control switch 26 which de-energizes all the electrical parts of the system. Immediately the toast carriage is raised to non-toasting or toast ejecting position the brake 70 is relieved of its pressure connection with the brake wheel 30 and the spring 35 returns the contact block 31 into engagement with the stop screw 37. Since the thermostat is subjected to a thermal stress at this time and its free end is returned to a fixed initial position, the inner end relatively rotates to turn the post 29 and wheel 30 in a clockwise direction. At the termination of the first cycle of operation the spring 65 has raised the lever 63 to its uppermost position which removes the foot 67 from engagement with the edge of the cam 68. The aforesaid relative rotation of the parts at the end of the first cycle moves the cam 68 a sufficient distance to pass the step 69 therein beyond the path of movement of the foot 67 so that on a closely succeeding toasting period the foot 67 will be moved into engagement with the lower portion of the cam 68 when the carriage is lowered to toasting position.

The elevation of the heating element with respect to the thermostat is determined by the following mechanism. When the foot 67 engages the upper surface of the cam 68 the lever 63 has then rotated to the limit of its possible movement in a clockwise direction. Since the pin 62 is at that time resting upon the lever 63 the system comprising lever 52, lever 57 and eccentric strap 59 has also reached the limit of its movement in a counter-clockwise direction. Since the heating element and its supporting mechanism is resting upon the free end of the lever 52 it is necessarily brought to a stop when the levers 52 and 63 are brought to the end limits of their movement, hence the ultimate position of the heater is determined by the elevation of the cam 68 at the point at which it is engaged by the foot 67.

As toasting periods succeed each other in closely spaced relation, the ambient of the toasting oven gradually increases as does the temperature of the thermostat 28. Consequently at the beginning of each cycle the cam 68 is rotated in a clockwise direction a slight additional amount which allows the heater 39 to approach closer and closer to the thermostat 28 and thus accelerate the rate at which it is heated. This last is necessary to compensate for two factors. Since the arc through which the thermostat must move for each toasting period is a constant value, the rate at which its temperature is increased during the toasting period must also be increased if the period is to be shortened with respect to the time required for the immediately preceding toasting period. Additionally the temperature of the thermostat is increasing relatively to the ambient in the control chamber which tends to increase its rate of heat rejection. This factor requires increases in the heating rate as sequential toasting periods follow one another closely.

The foregoing sequence of events is repeated until the toaster has reached an equilibrium condition, that is, a condition in which the temperature of the oven at the initiation of any particular cycle is not increased above its initial temperature for the immediately preceding toasting cycle. Under these conditions the position of the cam 68 is relatively unchanged as the two toasting periods in question must be of equal duration. The thermostat and heater arrangement must be so designed that the thermostat and heater are almost in an equilibrium condition when the toaster has reached equilibrium, that is, the thermostat is able to cool in a period of say 6 or 8 seconds, substantially the minimum interval between sequential toasting periods, through the temperature range through which it was heated during the immediately preceding toasting period. This is the ultimate equilibrium condition of the timing mechanism to produce toast of equal quality during a series of sequential toasting periods.

The foregoing is of course subject to modification by operation of the dial 5 which operates through the shaft 53, eccentric 60, eccentric strap 59 and lever 57 to change the position of the stop pin 62 relative to the heater positioning lever 52. The effect of operation of the selecting dial 5 is to lower the heating element to shorten the toasting period and thus produce toast of lighter color or to raise the heating element 39 and thus lengthen the toasting period and produce toast of darker color, however, for any particular setting of the dial 5, the present control mechanism operates automatically in a self-compensating manner to control the duration of sequential toasting periods to produce toast of uniform quality during each period.

The present invention is best practiced by utilizing a thermostat having a small bulk and a large heat rejecting area. The small bulk, large heat rejecting area combination greatly facilitates cooling of the thermostat in the interval between toasting periods. In the disclosed arrangement the thermostat moves through a very small arc to accomplish its control function and is not called upon to exert a significant mechanical effort to perform that function. By reason of these factors a comparatively small increase in the temperature of the thermostat during any toasting period is sufficient to produce the required degree of movement.

Figure 5:
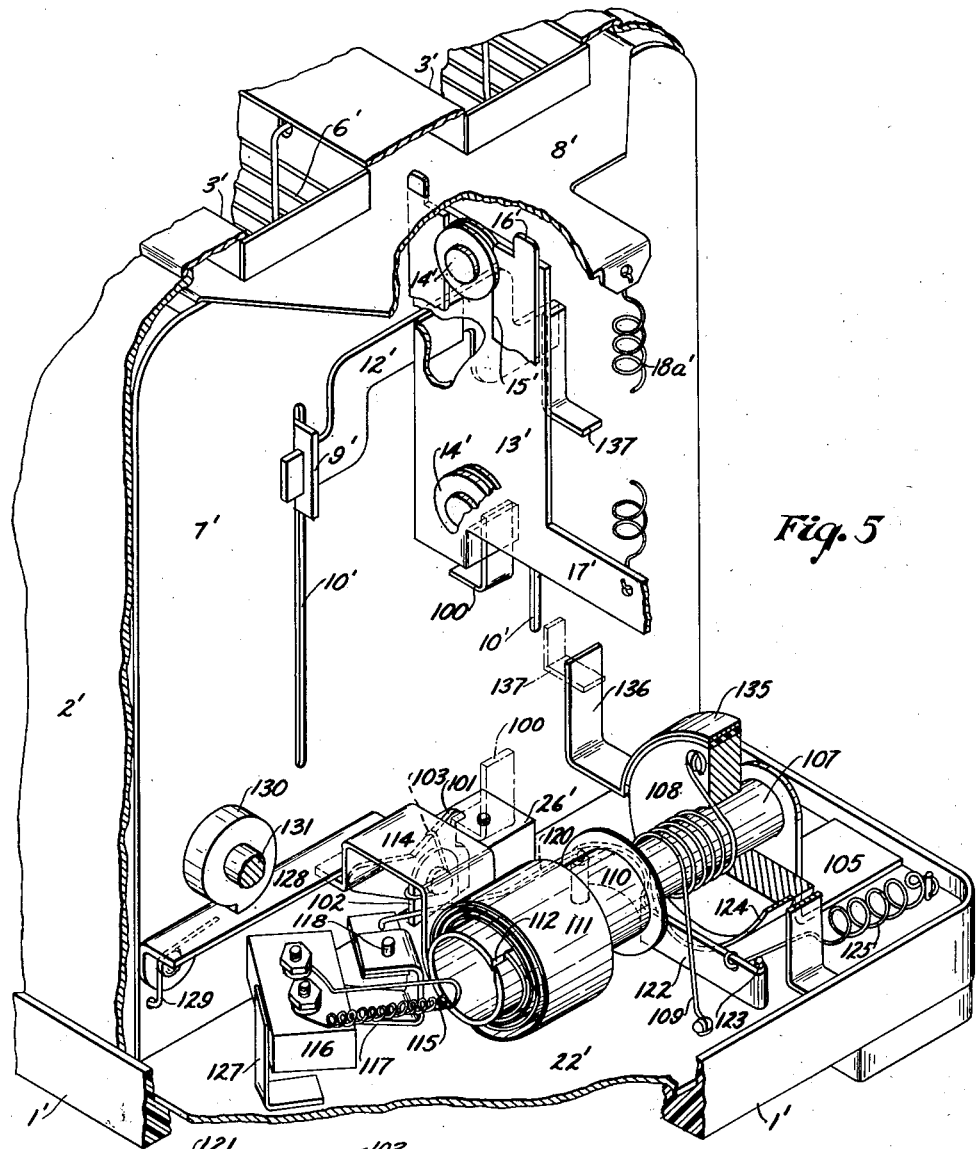
Figure 5 is an end perspective view with parts broken away to show the interior construction of a modified form of the invention.
Figure 6:
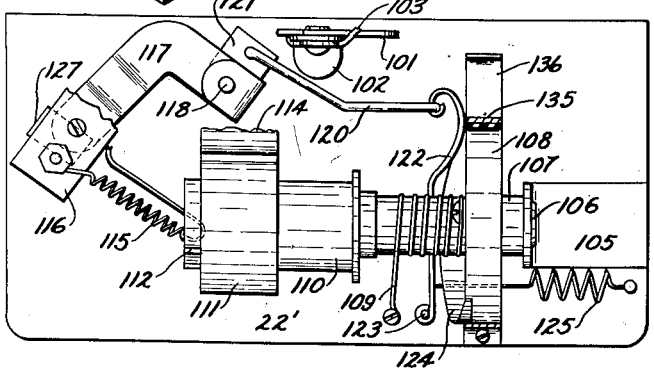
Figure 6 is a plane view of the timing mechanism incorporated in the structure shown in Figure 5.

A modified form of the invention is illustrated in Figures 5 and 6. Numerous parts of the apparatus shown in these figures are identical with corresponding parts of the apparatus heretofore described in connection with Figures 1 to 4 and are therefore given identical reference characters distinguished by the addition of a prime. The toast carriage supporting mechanism is substantially identical with that described heretofore in connection with Figures 1 to 4. The present modification differs from that previously described in the construction of the timing mechanism.

The toast carriage slide plate 13' carries a depending latch engaging tongue 100 adapted to be secured by a pivoted latch 101. The latch 101 is mounted upon a bracket 102 attached to the base plate 22'. A torsion spring 103 urges the latch 101 in a clockwise direction in position to latch and secure the tongue 100. The limit of motion of the latch 101 in a clockwise direction is fixed by engagement of the right hand bottom portion thereof, as viewed in Figure 5, with the upper surface of the bottom plate 22'. The latch 101 serves to retain the toasting mechanism is toasting position with the toast supporting carriages lowered against the bias of the spring 18a' and with the control switch 26' retained in closed circuit position by engagement with the under side of the latch tongue 100. The lower latched position of the tongue 100 is indicated in dotted lines in Figure 5.

The timing mechanism also comprises a bracket 105 secured to the base plate 22'. This bracket supports a horizontally projecting stud 106 upon which is rotatably mounted a sleeve 107. A brake wheel 108 is secured to the sleeve 107 for rotation therewith. A torsion spring 109 wrapped loosely around the sleeve 107 urges the brake wheel 108 and sleeve 107 in a clockwise direction as viewed in Figure 5. The outer end of sleeve 107 is attached to and supports an enlarged sleeve or drum 110 around the outer end portion of which is wrapped a light spiral bimetallic thermostatic element 111. The inner end of the thermostatic element 111 is secured in a slot 112 in the sleeve 110. The outer free end 114 of the thermostat 111 is bent at right angles to the axis of the shaft 107 and extends over a portion of the latch 101 in position to engage and release the same when the thermostat responds to an increase in temperature.

Heat is applied to the thermostat by means of a heating element 115 mounted upon an insulating block 116 containing suitable electrical connections for conveying electric current to the heating element. The block 116 is mounted upon an L-shaped bracket 117 pivotally mounted upon the base 22' of the toasting structure by means of a pin 118. The L-shaped bracket is so positioned relative to the sleeve 110 that the heating element 115 may be projected into and withdrawn from the interior of the sleeve without touching any portion thereof. In this manner the rate of heating the thermostat 111 is controllable by controlling the penetration of heater 115 within sleeve 110.

The position of the heater 115 relative to the thermostat 111 is regulated by a cam and linkage mechanism comprising a link 120 pivotally connected at one end to a projecting arm 121 rigid with the L-shaped lever 117. The other end of the link 120 is pivotally connected to a cam follower link 122 which is pivoted at 123 to the base plate 22' of the toasting chamber. One side of the cam follower 122 bears upon the outer edge of a cylindrical cam 124 formed on one end face of the brake drum wheel 108. A tension spring 125 urges the cam follower 122 in a clockwise direction, as viewed in Figure 6, to maintain it in contact with the cylindrical cam 124. Movement of the cam follower link 122 and its connected parts carrying the heating element 115 is limited by a fixed stop 127 secured to the base plate 22' of the control chamber. The stop 127 is so positioned relative to the thermostat that the heating element 115 is completely withdrawn from the sleeve 110, and hence heating relation to the thermostat 111, when the block 116 contacts it.

The end 114 of the thermostat 111 overlying the latch 101 underlies a stop bar 128 pivotally carried by the partition plate 7'. The stop bar 128 is urged in a counter-clockwise direction by a torsion spring 129. Counter-clockwise rotation of the stop bar 128 is limited by engagement with an adjusting cam 130 carried by a shaft 131 which is pivoted upon the partition 7'. The outer end of the shaft 131 will project through the outer appearance casing 2' of the toaster and will carry a dial such as the adjusting dial 5 described above in connection with the form of the invention illustrated in Figures 1 and 2. The cam 130 determines the limit position of the thermostat 111 during the intervals between toasting periods under the bias of the torsion spring 109 and hence the degree of movement required by the thermostat to terminate a toasting period.

The brake wheel 108 is partially embraced by a brake band 135 anchored at one end to the base plate 22' of the toaster chamber and provided at its other end with a projecting tongue 136 which underlies a brake foot 137 carried by the toast rack slide plate 13'. The lower brake setting position of the foot 137 is indicated in dotted lines in Figure 5.

When the toast carriage is lowered to latched position, the latch tongue 100 operates the switch 26 to energize the heating elements 115 and 6' simultaneously and the brake setting foot 137 engages the tongue 136 to set the brake 135 and present further rotation of the drum 108 and thermostat supporting structure. As the thermostat 111 heats, it uncoils in a counterclockwise direction and ultimately operates the latch 101 to release the latch tongue 100 and terminate the toasting period. At the termination of a toasting period the release of the brake 135 allows the torsion spring to rotate the thermostat mounting assembly as a unit until the operating end 114 of the thermostat contacts the stop lever 128. Since the thermostat is now in a heat stressed condition, it allows the spring 109 to rotate the drum 108 and its connected parts in a clockwise direction from the position occupied by these parts during the preceding toasting period. The spring does not possess sufficient strength to measurably stress the thermostat. It is capable of rotating the entire assembly only to the point at which the thermostat engages bar 128. Such rotation of the drum 108 shifts the cam 124 relative to the follower 122. The cam 124 is proportioned to provide a large increment in the advance of the heating element into heating relation to the thermostat to provide a long initial toasting period. After the first toasting period the increments of advance of the heater are smaller as the succeeding toasting periods are shortened to lesser degrees.

The foregoing sequence of events is repeated for succeeding toasting periods provided the periods are initiated closely following one another so that the ambient of the toaster at the initiation of each period is higher than the corresponding ambient at the initiation of the immediately preceding toasting period. Ultimately the toasting oven reaches an equilibrium condition during which the temperature thereof at the beginning of a toasting period is the same as the initial oven temperature for the immediately preceding toasting period. Under these conditions the heating element is in its most intimate heating relation to the thermostat 111. The heat input is therefore at its maximum rate. The thermostat is now operating at such an elevated temperature range that it cools with extreme rapidity, immediately the heater is de-energized, through the temperature range through which it was heated during the immediately preceding toasting cycle hence succeeding toasting periods now have equal duration.

The duration of toasting periods is manually settable by adjustment of the cam 130 to control the color of the toast. The cam operates the stop bar 128 to alter the degree of movement required of the thermostat to operate the release latch 101. This has the effect of varying the temperature through which the thermostat is heated during toasting periods.

The present invention provides a toaster control mechanism in which a single thermostatic element times the toasting period and also readjusts its relation to the heating element during the intervals between toasting periods to maintain a constant net compensation for varying oven temperatures so that the apparatus is always set to produce a toasting period timed to the initial oven temperature.

Various changes in the construction and arrangement of parts may be made without departing from the spirit of the invention or the scope of the appended claims.

I claim:

1. In a toaster, an oven, means for heating said oven, a thermostat for governing the duration of toasting operations, means for heating said thermostat, means mounting said thermostat heating means for movement toward and away from said thermostat and biased to move toward said thermostat, means activated by said thermostat for de-activating said heating means and for moving said thermostat heating means to a position remote from said thermostat to terminate a toasting operation, a stop for limiting movement of said thermostat toward said thermostat heating means, means for activating said heating means and for moving said thermostat heating means toward said thermostat to the limit allowed by said stop to initiate a toasting operation, means operated by said thermostat for positioning said stop according to the thermal condition of said thermostat, and means operated by said toasting operation initiating means for securing said stop in fixed position during toasting operation 2. Apparatus according to claim 1 including means for varying the position of said stop independently of the thermal condition of said thermostat to vary the duration of toasting operations.

3. In a toaster, an oven, a heater for said oven, a thermostat, a heater for said thermostat, mechanism providing for movement of said thermostat heater toward and away from said thermostat including positioning means operated by said thermostat for establishing the space positions of said thermostat heater and said thermostat relative to each other to compensate said thermostat for variations in oven temperatures, control means for energizing and de-energizing said heaters, toasting operation initiating means for actuating said control means to energize said heaters, and toasting operation terminating means actuated by said thermostat for de-energizing said heaters.

4. In a toaster, an oven, a heater for said oven, a thermostat, a heater for said thermostat, means mounting said thermostat heater for movement in directions toward and away from said thermostat and biased to move said thermostat heater in one of said directions, heater control means operable to activate and deactivate said heaters, movable means connected to said thermostat to be moved thereby for limiting movement of said thermostat heater in the direction in which it is biased to move to establish the operating position of said thermostat heater, holding means operable to secure said movable means against movement of said thermostat and to release said movable means, toasting operation initiating means for operating said control means to activate said heaters and for operating said holding means to secure said movable means, toasting operation terminating means for actuating said control means to deactivate said heaters and for actuating said holding means to release said movable means, and means actuated by heat induced deformation of said thermostat for setting said terminating means into operation.

5. Toaster timing mechanism comprising a spiral bimetal having one end secured to a rotatable support, a heating element for heating said bimetal, a brake mechanism operative when set to secure said support against rotation, a timing operation terminating means arranged to be operated by the other end of said bimetal for de-energizing said heating means, means for retaining said other end of said bimetal in predetermined relation to said terminating means in the intervals between timing operations, means operated by rotational movement of said support for determining the relative positions of said heating element and said bimetal, and means for setting said brake mechanism and for energizing said heating element to initiate a timing operation.

6. Toaster timing mechanism comprising a spiral bimetal having one end secured to a rotatable support, a heating element for heating said bimetal, a brake mechanism operative when set to secure said support against rotation, a timing operation terminating means arranged to be operated by the other end of said bimetal for de-energizing said heating means, means for retaining said other end of said bimetal in predetermined relation to said terminating means in the intervals between timing operations, means operated by rotational movement of said support for determining the relative positions of said heating element and said bimetal, and means for setting said brake mechanism and for energizing said heating element to initiate a timing operation, and manually settable means for varying the relative positions of said bimetal and heating element independently of the temperature of said bimetal.

7. In a toaster, an oven, means for heating said oven, a spiral bimetal having its inner end secured to a rotatable support, a brake for securing said support against rotation, a heater for said thermostat mounted for movement towards and away therefrom, means operative in the intervals between toasting operations for moving said heater away from said bimetal and for releasing said brake, means for releasing said heater from said last mentioned means and for setting said brake and for energizing said heater and said heating means to initiate a toasting operation, means operated by the free end of said thermostat for releasing said brake and for de-energizing said heater to terminate a toasting operation, means biasing the free end of said thermostat to a fixed position, a stop for determining the distance between said heater and said thermostat during toasting operations, and a cam on said support cooperating with said stop to fix the position thereof to compensate for oven temperature.

8. Toaster timing mechanism comprising a thermostat having a movably mounted part and a free part, a heater for said thermostat, timing operation terminating means operated by said free part to de-energize said heater, means including a cam surface operated by said movably mounted part of said thermostat for determining the relative positions of said thermostat and heater during timing operations, means biasing said free part to a fixed position, timing operation initiating means for securing said movably mounted part of said thermostat against movement and for energizing said heater, said cam being arranged to position said heater closer to said thermostat during a timing operation immediately following a timing operation initiated from a cold start by a comparatively large amount and to position said heater closer and closer to said thermostat by comparatively small amounts as the timing operations closely follow said first mentioned timing operation.

9. Toaster timing mechanism comprising a spiral bimetal having one end secured to a rotatable support, a heating element for heating said bimetal, a brake mechanism operative when set to secure said support against rotation, a timing operation terminating means arranged to be operated by the other end of said bimetal for de-energizing said heating means, means for retaining said other end of said bimetal in predetermined relation to said terminating means in the intervals between timing operations, means operated by rotational movement of said support for determining the relative positions of said heating element and said bimetal, and means for setting said brake mechanism and for energizing said heating element to initiate a timing operation, and manually settable means for varying the degree of movement of said bimetal required to operate said terminating means.

10. In a toaster, an oven, a heater for said oven, a thermostat, a heater for said thermostat, control means for activating and de-activating said heaters, mechanism for varying the position of said thermostat heater relative to said thermostat including a member movable by said thermostat for limiting movement of said thermostat heater to establish the operating positions of said thermostat and said thermostat heater, holding means for securing said themostat heater immovably and for releasing said thermostat heater for movement relative to said thermostat, means for operating said control means to activate said heaters and for operating said holding means to secure said thermostat heater in the operating position established by said member, and means including an operating part actuated by said thermostat for operating said control means to de-activate said heaters for operating said holding means to release said thermostat heater.

11. In a toaster, an oven, a heater for said oven, a thermostat, a heater for said thermostat mounted to move in directions toward and away from said heater and biased to move in one of said directions, control means for activating and de-activating said heaters, movable means connected to be operated by said thermostat for limiting movement of said thermostat heater in the direction in which said thermostat heater is biased to move to establish the operating relation between thermostat heater and said thermostat, toasting operation initiating means for actuating said control means to activate said heaters and for securing said thermostat heater immovably in the position determined by said movable means, toasting operation terminating means for actuating said control means to de-activate said heater and for actuating said initiating means to release said thermostat heater, and means operated by said thermostat for setting said terminating means into operation.

12. In a toaster, a timing mechanism for determining the duration of toasting operations comprising a thermostat, a heater for said thermostat, means arranged to be activated by said thermostat for de-energizing said heater to terminate a timing operation, means for maintaining a predetermined non-operating relation between said terminating means and said thermostat independently of the thermal condition of said thermostat, mechanism providing for relative movement between said thermostat and said heater including means operated by said thermostat for establishing the relative space positions of said thermostat and said heater according to the thermal condition of said thermostat, and timing operation initiating means for energizing said heater and for rendering said second mentioned means inoperative during timing operation.

13. In a toaster, a timing mechanism for determining the duration of toasting operations comprising a thermostat, a heater for said thermostat, means arranged to be activated by said thermostat for de-energizing said heater to terminate a timing operation, means for maintaining a pre-determined non-operating relation between said terminating means and said thermostat independently of the thermal condition of said thermostat, means mounting said thermostat and said heater for relative movement biased to effect such movement in one direction, means operated by said thermostat for limiting such movement in accordance with the thermal condition of said thermostat, timing operation initiating means operative during timing operation to energize said heater, to secure said heater in a position determined by said limiting means at the initiation of a timing operation and for rendering said second mentioned means inoperative.

14. In a toaster, an oven, means for heating said oven, a thermostat having two portions movable by changes in the temperature of said thermostat, means for heating said thermostat, means mounting said thermostat heating means for movement relative to said thermostat, means operated by one of said portions of said thermostat for de-energizing said heating means to terminate a toasting operation, means operated by the other portion of said thermostat for moving said thermostat heating means relative to said thermostat in accordance with the temperature of said oven, means operative in the intervals between toasting operations to maintain said one portion of said thermostat in fixed position, and means operative during toasting operations for securing said other portion of said thermostat against movement.

15. In a toaster, an oven, a heater for said oven, a timing mechanism for determining the duration of a toasting operation comprising a thermostat deformable in response to changes in its temperature, a heater for said thermostat, means mounting said thermostat and heater for relative movement to vary the space relation therebetween, means for de-energizing said heaters to terminate a toasting operation arranged to be operated by a predetermined deformation of said thermostat, movable means for maintaining said terminating means and said thermostat in predetermined non-operating relationship independently of the deformation of said thermostat, movable means operated in response to deformation of said thermostat for establishing a space relation between said thermostat and said heater in accord with the temperature of said thermostat, and toasting operation initiating means for securing each of said movable means in fixed position for the duration of a toasting operation.

16. In a toaster, an oven, means for heating said oven, a thermostat, a heater for said thermostat, means providing for relative movement between said thermostat and said heater to vary the heating effect on said thermostat including means operated by said thermostat for determining the toasting operation position of said thermostat and heater in accord with the temperature of said oven, means for de-energizing said heating means and said heater to terminate a toasting operation arranged to be operated by said thermostat, means for maintaining a predetermined non-operating relation between said thermostat and said terminating means, and toasting operation initiating means for securing said heater and thermostat in said toasting operating position and for rendering said predetermined position maintaining means inoperative.

17. In a toaster, an oven, means for heating said oven, a thermostat, a heater for said thermostat, means providing for relative movement between said thermostat and said heater to vary the heating effect on said thermostat including means operated by said thermostat for determining the toasting position of said thermostat and heater in accord with the temperature of said oven, means for de-energizing said heating means to terminate a toasting operation arranged to be operated by said thermostat, and toasting operation initiating means for energizing said heating means and for securing said thermostat and heater in said toasting operation position.

18. In a toaster, an oven, a heater for said oven, a movable support, a thermostat having one end secured to said support and a free end, a heater for said thermostat, means mounting said thermostat heater for movement in directions toward and away from said thermostat and biased in one direction, control means movable between a first position in which said heaters are energized and a second position in which said heaters are de-energized, mechanism for limiting movement of said thermostat heater in the direction in which it is biased to move including a controlling cam movable by said thermostat support and means biasing said free end of said thermostat to a predetermined position whereby deformation of said thermostat due to change in its temperature moves said support and said cam, a brake operative when set to hold said support immovably, means biasing said control means to said second position, securing means for holding said control means in said first position and for holding said brake set, toasting operation initiating means for setting said brake and moving said control means to said first position, and terminating means positioned to be actuated by heat induced movement of said free end of said thermostat for actuating said securing means to release said brake and said control means.

19. Apparatus according to claim 18 in which said mechanism includes a cam follower biased into engagement with said cam and said cam includes, a first surface which is moved into operative relation to said follower by said thermostat when said thermostat is cold, a second surface which is moved into operative relation to said cam follower when said thermostat is heated above a predetermined temperature, and an abrupt step joining said first and second surfaces.

20. Apparatus according to claim 18 including a member movable into engagement with said mounting means, and means connecting said member to said control means to move said member out of engagement with said mounting means when said control means is in said first position and for actuating said member to move said thermostat heater to a position remote from said thermostat when said control means is in said second position.

21. Apparatus according to claim 18 in which said mounting means is pivoted, and said mechanism includes a cam follower connected to impart pivotal motion to mounting means and a spring biasing said cam follower into engagement with said cam.

HARRY B. WHITE.

REFERENCES CITED

The following references are of record in the file of this patent:

UNITED STATES PATENTS

| Number | Name | Date |
|---|---|---|
| 1,963,924 | Smith | June 19, 1934 |
| 2,182,124 | Guerra | Dec. 5, 1939 |
| 2,195,638 | Anderson | Apr. 2, 1940 |
| 2,197,221 | Koci | Apr. 16, 1940 |
| 2,302,117 | Gomersall | Nov. 17, 1942 |
| 2,347,385 | Wright et al. | Apr. 25, 1944 |
| 2,436,735 | Walder et al. | Feb. 24, 1948 |
| 2,468,996 | Olson | May 3, 1949 |
| 2,557,512 | Padelford | June 19, 1951 |